United States Patent

Ozawa et al.

[11] Patent Number: 5,585,443
[45] Date of Patent: Dec. 17, 1996

[54] BLOCK COPOLYMER

[75] Inventors: Yoichi Ozawa; Hideo Takeichi, both of Tokyo, Japan

[73] Assignee: Bridgestone Corporation, Tokyo, Japan

[21] Appl. No.: 517,765

[22] Filed: Aug. 22, 1995

[30] Foreign Application Priority Data

Aug. 23, 1994 [JP] Japan .................................. 6-198789

[51] Int. Cl.⁶ .................................................. C08F 293/00
[52] U.S. Cl. ........................... 525/314; 525/315; 525/316; 526/340; 526/347
[58] Field of Search ........................... 526/340, 347; 525/314, 315, 316

[56] References Cited

FOREIGN PATENT DOCUMENTS

| 57-179212 | 11/1982 | Japan | C08F 236/10 |
| 60-23409 | 2/1985 | Japan | C08F 236/10 |
| 62-215639 | 9/1987 | Japan | C08L 9/06 |
| 1-230647 | 9/1989 | Japan | C08L 15/00 |

*Primary Examiner*—Edward J. Cain
*Attorney, Agent, or Firm*—Sughrue, Mion, Zinn, Macpeak & Seas

[57] ABSTRACT

A block copolymer comprises block A containing as a main component thereof a homopolymer consisting of units of a vinylaromatic hydrocarbon (VAH), block B consisting of units of a conjugated diene (CD), and block C consisting of VAH and CD, is represented by General Formulae (I) or (II), and has a structure in which blocks A, B, and C are repeated in the order shown in the General Formulae (I) or (II). The block copolymer contains 15 to 98% by weight of a block consisting of 20 to less than 200 VAH, 10% or less by weight of a block consisting of 200 or more VAH, 1 to 70% by weight of an isolated single VAH, and a block consisting of 2 to less than 20 VAH in an amount to make up the rest, each based on total VAH; 15 to 65% by weight of total VAH; 85 to 35% by weight of total CD; and a number-average molecular weight of $5 \times 10^4$ to $150 \times 10^4$. Another block copolymer has a structure in which the block copolymer described above is coupled by a polyfunctional coupling agent, and is represented by General Formulae (III) or (IV), wherein Y represents the residue of the polyfunctional coupling agent. The block copolymers are advantageously used for a tire tread rubber having higher abrasion resistance, higher tensile strength at high temperatures, and the like, in good balance without adverse effects on other properties.

$(C)_n$—A—$(C$—B—C—$A)_m$—$(C$—B$)_p$—$(C)_q$H    General formula I $(C)_n$—B—$(C$—A—C—$B)_m$—$(C$—A$)_p$—$(C)_q$H    General formula II $[(C)_n$—A—$(C$—B—C—$A)_m$—$(C$—B$)_p$—$(C)_q]_r$Y    General formula III $[(C)_n$—B—$(C$—A—C—$B)_m$—$(C$—A$)_p$—$(C)_q]_r$Y    General formula IV

17 Claims, 2 Drawing Sheets

BLOCK COPOLYMER

FIELD OF THE INVENTION

The present invention relates to a block copolymer, and more particularly, to a block copolymer advantageously used for a tire tread rubber which requires good abrasion resistance, tensile strength, and gripping property.

PRIOR ART OF THE INVENTION

Various types of block copolymers comprising, as the main components thereof, a block which mainly contains a homopolymer consisting of units of a vinyl aromatic hydrocarbon (occasionally referred to as an aromatic polymer block hereinafter) and a homopolymer block which consists of units of a conjugated diene (occasionally referred to as a conjugated diene polymer block hereinafter) have heretofore been known. Various types of block copolymers comprising an aromatic polymer block and a polymer part containing units of a conjugated diene, as the main components thereof, have also been known. Block copolymers such as those described above have many elements of molecular structure. Because properties of block copolymers can be changed by selecting and adjusting combinations of the elements, block copolymers can be used in many applications. For example, block copolymers are widely used in various applications such as thermoplastic resins, thermosetting resins, thermoplastic rubbers, thermosetting rubbers, and the like, by taking advantage of the thermoplastic property exhibited by an aromatic polymer block and the thermosetting property derived from reaction of a conjugated diene polymer block or a polymer part containing units of a conjugated diene with a crosslinking agent.

In general, good tensile strength at a high temperature and abrasion resistance are required of a rubber for a tire tread. Gripping properties, such as dry grip and wet grip, are also important properties often required of a rubber for a tire tread.

Application of block copolymers, which have the properties of thermosetting rubber and comprise as a main component thereof an aromatic polymer block and a polymer part containing units of a conjugated diene, to tread rubber have been attempted. Such attempts are described, for example, in Japanese Patent Application Laid-Open No. Showa 57(1982)-179212, Japanese Patent Application Laid-Open No. Showa 60(1985)-23409, Japanese Patent Application Laid-Open No. Showa 62(1987)-215639, and Japanese Patent Application Laid-Open No. Heisei 1(1989)-230647.

Japanese Patent Application Laid-Open No. Showa 57(1982)-179212 discloses a styrene-butadiene copolymer which contains 5% by weight or less off styrene blocks consisting of long sequences of styrene units and 50 by weight or more off an isolated single styrene unit, each based on the total units of styrene in the copolymer, and 10 to 30% by weight of the total units of styrene based on the copolymer. This styrene-butadiene copolymer exhibits high abrasion resistance.

Japanese Patent Application Laid-Open No. Showa 60(1985)-23409 discloses a styrene-butadiene copolymer which contains less than 50% by weight of short styrene blocks consisting of sequences of 1 to 3 styrene units, 30% by weight or more of styrene blocks consisting of sequences of 4 to 20 styrene units, and less than 20% by weight of long blocks consisting of sequences of more than 20 styrene units, each based on the total units of styrene in the copolymer, and 10 to 45% by weight of the total units of styrene based on the copolymer, and comprises a tin-carbon bond. This styrene-butadiene copolymer exhibits high tensile strength, high abrasion resistance, and low hysteresis loss.

Japanese Patent Application Laid-Open No. Showa 62(1987)-215639 discloses a styrene-butadiene copolymer which contains 5 to 80% by weight of styrene blocks consisting of short sequences of styrene units and 11 to 10% by weight of styrene blocks consisting of long sequences of styrene units, each based on the total units of styrene, and 40% by weight or less of the total units of styrene based on the copolymer, and modified with tin compounds at molecular ends thereof. This styrene-butadiene copolymer exhibits high impact strength, tensile strength, and abrasion resistance.

Japanese Patent Application Laid-Open No. Heisei 1(1989)-230647 discloses a styrene-butadiene copolymer which contains 40% by weight or less of an isolated single styrene unit, 60% by weight or more of styrene blocks consisting of sequences of 2 to 7 styrene units, and 10% by weight or less of styrene blocks consisting of sequences of 8 or more styrene units, each based on the total units of styrene, and 5 to 50% by weight of the total units of styrene based on the copolymer. This styrene-butadiene copolymer exhibits high tensile strength, abrasion resistance, and resilience.

When the advantages of the physical properties of the block copolymers are compared with the advantages of the styrene-butadiene copolymers of a random structure (containing no or only a small amount of blocks consisting of sequences of styrene units) disclosed in the prior arts described above, attention focuses on the investigation of properties exhibited by structures containing a larger number of blocks consisting of longer sequences of styrene units, as suggested by extrapolation of the knowledge in the prior arts.

However, all of the prior arts described above disclose that the maximum content of long styrene blocks consisting of sequences of 20 or more styrene units is 5 to 20% by weight based on the total styrene units in a copolymer, and that an excessive content of blocks consisting of long sequences of styrene units causes adverse effects on physical properties. On the other hand, all of the styrene-butadiene block copolymers described in these prior arts can be considered to be prepared according to anionic polymerization using an alkali metal compound, such as an alkali metal salt, as a randomizer. It is already known that, when anionic polymerization is conducted by using an alkali metal compound as a randomizer to avoid uneven styrene distribution, such as a long styrene block at an end of the polymer chain, is avoided, the resultant copolymer contains only a small amount of styrene blocks consisting of long sequences of 20 or more styrene units. On the basis of the facts described above, it is apparent that the content of styrene blocks consisting of long sequences of styrene units is held below a specified value in the prior arts described above mainly for the purpose of avoiding deterioration in physical properties, because physical properties as a rubber compound are not preferable if a long styrene block exists at an end of a polymer chain, such as the block in copolymers having a structure represented by S—B or S—B—S.

It can be concluded from the foregoing description on the prior arts that synthesis of a styrene-butadiene block copolymer having a structure in which many blocks consisting of long sequences of styrene units are contained with a distribution microscopically uniform to some degree has not been known heretofore. Accordingly, physical properties of vulcanizates prepared by using such a copolymer, and the relation of the structure and the physical properties of such a copolymer are also unknown.

SUMMARY OF THE INVENTION

In view of the aforementioned, an object of the present invention is to provide a block copolymer advantageously used for a tire tread rubber which can achieve better physical properties, such as higher abrasion resistance, higher tensile strength at a high temperature, and the like, in a good balance at a high level of these properties without adverse effects on other properties, by controlling elements in the molecular structure of the block copolymer, such as the number of styrene units in sequence in a block, the contents of the blocks in the copolymer, and the like.

The present invention provides a block copolymer which comprises a block (block A) containing as a main component thereof a homopolymer consisting of units of a vinylaromatic hydrocarbon, a homopolymer block (block B) consisting of units of a conjugated diene, and a copolymer block (block C) consisting of units of the vinylaromatic hydrocarbon and units of the conjugated diene, is represented by General Formulae (I) or (II), and has a structure in which blocks A, B, and C are repeated in the order shown in the General Formulae (I) or (II) which represents said block copolymer, said block copolymer having:

- a content ($L^1$) of blocks consisting of sequences of 20 to less than 200 units of the vinylaromatic hydrocarbon in the range of 15 to 98% by weight, a content ($L^2$) of blocks consisting of sequences of 200 units or more of the vinylaromatic hydrocarbon in the range of 10% by weight or less, a content ($L^3$) of an isolated single unit of the vinylaromatic hydrocarbon in the range of 1 to 70% by weight, and a content of blocks consisting of sequences of 2 to less than 20 units of the vinylaromatic hydrocarbon of $[100-(L^1+L^2+L^3)]$ % by weight, each based on total units of the vinylaromatic hydrocarbon;
- a content of total units of the vinylaromatic hydrocarbon in the range of 15 to 65% by weight of said block copolymer;
- a content of total units of the conjugated diene in the range of 85 to 35% by weight of said block copolymer; and
- a number-average molecular weight of said block copolymer in the range of $5 \times 10^4$ to $150 \times 10^4$.

$(C)_n$—A—$(C—B—C—A)_m$—$(C—B)_p$—$(C)_q$H  General formula I

$(C)_n$—B—$(C—A—C—B)_m$—$(C—A)_p$—$(C)_q$H  General formula II (In the formulae, A represents block A, B represents block B, C represents block C, m represents an integer of 4 to 100, n, p, and q each represent 0 or 1, a plurality of block A comprised in said block copolymer may be the same or different, a plurality of block B comprised in said block copolymer may be the same or different, and a plurality of block C comprised in said block copolymer may be the same or different.)

The present invention also provides a block copolymer which contains a component block copolymer comprising a block (block A) containing as a main component thereof a homopolymer consisting of units of a vinylaromatic hydrocarbon, a homopolymer block (block B) consisting of units of a conjugated diene, and a copolymer block (block C) consisting of units of the vinylaromatic hydrocarbon and units of the conjugated diene, said block polymer being represented by General Formulae (III) or (IV) and having a structure in which blocks A, B, and C are repeated in the order shown in the General Formulae (III) or (IV) which represents said block copolymer, and said block copolymer having a structure in which the component block copolymers are bonded to each other through a tin atom or a silicon atom, and said block copolymer having:

- a content ($L^1$) of blocks consisting of sequences of 20 to less than 200 units of the vinylaromatic hydrocarbon in the range of 15 to 98% by weight, a content ($L^2$) of blocks consisting of sequences of 200 units or more of the vinylaromatic hydrocarbon in the range of 10% by weight or less, a content ($L^3$) of an isolated single unit of the vinylaromatic hydrocarbon in the range of 1 to 70% by weight, and a content of blocks consisting of sequences of 2 to less than 20 units of the vinylaromatic hydrocarbon of $[100-(L^1+L^2+L^3)]$ % by weight, each based on total units of the vinylaromatic hydrocarbon,
- a content of total units of the vinylaromatic hydrocarbon in the range of 15 to 65% by weight of said block copolymer, and
- a content of total units of the conjugated diene in the range of 85 to 35% by weight of said block copolymer; and
- the component block copolymer has a number-average molecular weight in the range of $5 \times 10^4$ to $150 \times 10^4$.

(In the formulae, A represents block A; B represents block B; C represents block C; Y represents the residue of a polyfunctional coupling agent which is selected from the group consisting of tin compounds having a plurality of halogen atoms, silicon compounds having a plurality of halogen atoms, silicon compounds having a plurality of alkoxy groups, polyepoxy compounds, polyhalogenated hydrocarbons, esters of polycarboxylic acids, anhydrides of polyacids, polyisocyanates, polyaldehydes, polyketones, and polyvinyl compounds; m represents an integer of 4 to 100; n, p, and q each represent 0 or 1; x represents an integer of more than 2; a plurality of block A comprised in said block copolymer may be the same or different; a plurality of block B comprised in said block copolymer may be the same or different; and a plurality of block C comprised in said block copolymer may be the same or different.)

DETAILED DESCRIPTION OF THE INVENTION

Extensive investigations undertaken by the present inventors in consideration of the objects described above lead to the discovery that a block copolymer comprising specific amounts of block A having a long sequence of 20 or more styrene units, block B, and block C, which are microscopically uniformly distributed in the molecule with a structure in which blocks A, B, and C are repeated, can be advantageously used for a tire tread rubber having better physical properties, such as higher abrasion resistance, higher tensile strength at a high temperature, and the like, in good balance without adverse effects on other properties. The present invention has been achieved on the basis of this discovery.

The mechanism according to which the excellent properties of the block copolymer of the present invention are exhibited has not yet been fully realized. It is considered that the excellent properties are exhibited because characteristic microphase separation takes place due to the uniform distribution of essentially incompatible components, such as a polystyrene block and a polybutadiene block of respective specific sequence lengths, in the molecular chain of the copolymer, and because relaxation of stress and change in hysteresis loss take place due to deformation, transformation, and reformation of this phase structure while mechanical stress being applied to the rubber.

The present invention is described in detail hereinafter.

In the present invention, the unit of a vinylaromatic hydrocarbon is a unit obtained by polymerization of a vinylaromatic hydrocarbon monomer, and the unit of a conjugated diene is a unit obtained by polymerization of a conjugated diene monomer. The block (block A), which contains as a main component thereof a homopolymer consisting of units of a vinylaromatic hydrocarbon, is a homopolymer block consisting of units of a vinylaromatic hydrocarbon or is a polymer block consisting of blocks of units of a vinyl aromatic hydrocarbon separated by a trace amount of a unit of the conjugated diene. The block (block C), which consists of units of the vinylaromatic hydrocarbon and units of the conjugated diene, is a block of a copolymer containing an isolated single unit and short sequences of units of the vinylaromatic hydrocarbon, and units of the conjugated diene. Namely, block C is a random copolymer ("random copolymer" being interpreted broadly here). The structure in which blocks A, B, and C are repeated is a structure in which blocks A, B, and C are repeated in the order shown in General Formulae I to IV, and in which blocks A, B, C are distributed uniformly in the molecular chain of the copolymer. The number of the unit of the vinylaromatic hydrocarbon in a sequence and the content of the unit of the vinylaromatic hydrocarbon in the copolymer are obtained by using an ozonolysis-gel permeation chromatography analysis (GPC) which is described in detail later.

Examples of the vinylaromatic hydrocarbon monomer which provides the unit of the vinylaromatic hydrocarbon described above after polymerization include styrene, α-methylstyrene, p-methylstyrene, o-methylstyrene, p-butylstyrene, vinylnaphthalene, and the like. Styrene is preferable among these compounds because of advantages in industrial application.

As the conjugated diene monomer which provides the unit of the conjugated diene, a conjugated diene hydrocarbon having 4 to 12 carbon atoms is preferable, and a conjugated diene hydrocarbon having 4 to 8 carbon atoms is more preferable in order to exhibit the effects of the present invention more remarkably. Examples of the conjugated diene monomer include 1,3-butadiene, isoprene, 2,3-dimethyl-1,3-butadiene, 1,3-pentadiene, octadiene, and the like. The conjugated diene monomer may be used singly or as a combination of two or more types. Among these compounds, isoprene and 1,3-butadiene are preferable, and 1,3-butadiene is particularly preferable because of advantages in industrial application.

The contents of the isolated single unit of a vinylaromatic hydrocarbon (the unit of a vinylaromatic hydrocarbon is occasionally referred to as unit (a), hereinafter) and blocks consisting of sequences of a plurality of unit (a) in the block copolymer are described hereinafter. The content $L^1$ of blocks consisting of sequences of 20 to less than 200 unit (a) is in the range of 15 to 98% by weight based on the total unit (a), and preferably 20 to 98% by weight based on the total unit (a) for exhibiting the effects of the present invention more remarkably. When $L^1$ is less than 15% by weight of the total unit (a), the physical properties of the block copolymer, such as tensile strength, are not sufficient. When $L^1$ is more than 98% by weight, preparation of the block copolymer is difficult.

The content $L^2$ of blocks consisting of sequences of 200 or more unit (a) is in the range of 10 or less % by weight based on the total unit (a), and preferably 8% by weight or less based on the total unit (a) for exhibiting the effects of the present invention. A content $L^2$ of more than 10% by weight is not preferable because workability during processing of the block copolymer is inferior.

The content $L^3$ of the isolated single unit of unit (a) is in the range of 1 to 70% by weight based on the total unit (a), and preferably 1 to 40% by weight based on the total unit (a) for exhibiting the effects of the present invention more remarkably. When $L^3$ is less than 1% by weight, preparation of the copolymer is difficult in actuality. When $L^3$ is more than 70% by weight, physical properties of the block copolymer, such as tensile strength, are inferior. Thus, $L^3$ falling outside of the specified range is not preferable.

The content of blocks consisting of sequences of 2 to less than 20 unit (a) makes up the remaining part, which is $[100-(L^1+L^2+L^3)]$ % by weight based on the total unit (a).

The contents of the isolated single unit of unit (a) and blocks consisting of sequences of a plurality of unit (a) in the block copolymer are determined by ozonolysis of the entire block copolymer containing blocks A, B, and C, followed by GPC analysis. Blocks A, B, and C are not analyzed in separate runs, but are analyzed simultaneously.

In General Formulae I to IV representing the block copolymers of the present invention, block A has been defined as a homopolymer block consisting of units of a vinylaromatic hydrocarbon or a polymer block mainly consisting of units of the vinyl aromatic hydrocarbon separated by a trace amount of the conjugated diene unit. Similarly, block B has been defined as a homopolymer block consisting of units of a conjugated diene. Block C has been defined as a block of a copolymer containing an isolated single unit and short sequences of units of the vinylaromatic hydrocarbon, and units of the conjugated diene.

As can be understood from the method of preparation of the block copolymer which will be described later, block A also includes blocks consisting of sequences of 20 to less than 200 unit (a) and/or blocks consisting of sequences of 200 or more unit (a), and block C includes the isolated single unit (a) and/or blocks consisting of sequences of 2 to less than 20 unit (a).

In the block copolymer of the present invention, the content of the total unit (a) is 15 to 65% by weight based on the block copolymer, and preferably 15 to 45% by weight based on the block copolymer for exhibiting superior physical properties, such as tensile strength. When the content is less than 15% by weight, tensile strength is inferior. When the content is more than 65% by weight, abrasion resistance and low temperature properties are inferior. Therefore, a content falling outside of the specified range is not preferable. The content of the total units of the conjugated diene makes up the remaining part. Thus, the content is 85 to 35% by weight, preferably 85 to 55% by weight, based on the block copolymer.

The content of the vinyl structure in the units of a conjugated diene, such as the units of butadiene, is 8 to 80% by mol of the total units of the conjugated diene, and preferably 10 to 60% by mol of the total units of the conjugated diene for exhibiting good physical properties, such as abrasion resistance and tensile strength at break. When the content is less than 8% by mol, preparation of the block copolymer is difficult. When the content is more than 80% by mol, abrasion resistance and low temperature properties are inferior. Therefore, a content outside of the specified range is not preferable.

The block copolymer represented by General Formula (I) or (II) has a number-average molecular weight of $5\times10^4$ to $150\times10^4$, and preferably $10\times10^4$ to $110\times10^4$ for achieving better physical properties. Molecular weight distribution $M_w/M_n$ is in the range of 1.05 to 5.00, preferably 1.05 to 2.50. When the number-average molecular weight is less than $5\times10^4$, strength at break and abrasion resistance are inferior to a great degree. When the number-average molecular weight is more than $150\times10^4$, it is difficult to prepare the block copolymer in a industrial process. When the molecular weight distribution is more than 5.00, the effects of the present invention are not effectively exhibited, and therefore, a molecular weight distribution more than 5.00 is not preferable.

In General Formulae, m represents the number of times a multi-block part comprising blocks A, B, and C is repeated. The multi-block part is a most important part in the molecular structure of the present invention and is expressed as C—B—C—A or C—A—C—B in the general formulae. m is an integer of 4 to 100, preferably 5 to 50, and more preferably 8 to 25 for exhibiting still better effects. When m is less than 4, characteristic physical properties as a rubber are diminished and properties as a thermoplastic elastomer (for example, S—B—S type) tend to dominate. Thus, processability and workability deteriorate remarkably, and the physical properties of the vulcanizate obtained from the block copolymer also become inferior. When m is more than 100, it is actually difficult to prepare the block copolymer in an industrial process, and the advantageous effects on physical properties deteriorate. Therefore, m falling outside of the specified range is not preferable. When m is in the specified range, it is shown that blocks A, B, and C are distributed uniformly in the chain of the block copolymer according to some type of regularity. Therefore, m bears a very important meaning.

In the general formulae, n, p, and q each represent 0 or 1. This means that block C, diblock C—B and diblock C—A each having n, p or q may be absent or present as needed.

In General Formulae (III) and (IV), Y represents the residue of a coupling agent which is any polyfunctional coupling agent, such as tin compounds having a plurality of halogen atoms, silicon compounds having a plurality of halogen atoms, silicon compounds having a plurality of alkoxy groups, polyepoxy compounds, polyhalogenated hydrocarbons, esters of polycarboxylic acids, anhydrides of polyacids, polyisocyanates, polyaldehydes, polyketones, and polyvinyl compounds. Preferably, halogenated tin or halogenated silicon compounds are used. When low hysteresis loss is required, halogenated tin compounds are used as the coupling agent.

An example of preparing the block copolymer of the present invention is described hereinafter.

The block copolymer of the present invention can be prepared stoichiometrically and easily according to living polymerization of a monomer using an organometallic compound, particularly an organolithium compound, as a polymerization initiator.

A process for preparation of a block copolymer expressed by General Formula (I-1) (n=0, m=14, p=1, and q=0) using styrene as the vinylaromatic hydrocarbon monomer, butadiene as the conjugated diene monomer, and n-butyllithium as the polymerization initiator, is described hereinafter. Subscript and superscript characters are shown for clarity of description.

$A^1$—$(C^1$—$B^1$—$C^2$—$A^2)_{14}$—$(C^3$—$B^2)_1$H    General formula I-1

(1) $\frac{1}{15}$ of the total amount of styrene is polymerized to a conversion of 90% or more in the presence or absence of a randomizer, and a homopolymer block of styrene $A^1$ is obtained (more accurately, the product is $A^1$ attached to an n-butyl group derived from the initiator, as shown by the formula: n-$C_4H_9$—$A^1$). In the following processes, conversion of the monomers is 90% or more in all cases. It is actually difficult to reach a conversion of 100%, and some amount of the monomer is inevitably left unreacted. In the case of this first reaction, some amount of styrene is left unreacted. When the conversion is less than 90%, the amount of the monomer left unreacted increases, and the length of the sequence of the copolymer block C is increased due to the copolymerization with the other monomer added subsequently. Therefore, the effects of the present invention cannot be sufficiently exhibited when the conversion is less than 90%. (2) When the conversion in step (1) reaches 90% or more, $\frac{1}{15}$ of the total amount of butadiene is added immediately to the reaction product thus formed, because the active lithium end may become inactive if the next monomer is not added immediately. After the addition of the butadiene, copolymerization of the styrene left unreacted in step (1) with the butadiene first takes place to form a copolymer block $C^1$. Thereafter, the butadiene is polymerized, and the resultant homopolymer block of butadiene $B^1$ is bonded to $C^1$. Some amount of butadiene is left unreacted. (3) $\frac{1}{15}$ of the total amount of styrene is added immediately thereafter. Copolymerization of the butadiene left unreacted in step (2) with the styrene first takes place to form a copolymer block $C^2$. Thereafter, the styrene is polymerized, and a block $A^2$ containing a homopolymer of styrene as the main component thereof is formed. Some amount of styrene is left unreacted. (4) After repeating steps (2) and (3) a total of 14 times, $(C^1$—$B^1$—$C^2$—$A^2)_{14}$ is obtained. Some amount of styrene is left unreacted. (5) $\frac{1}{15}$ of the total amount of butadiene is added immediately thereafter. Copolymerization of the styrene left unreacted in the previous step with the butadiene first takes place to form a copolymer block $C^3$. Thereafter, the butadiene is polymerized, and a homopolymer block of butadiene $B^2$ is formed. (6) When the active lithium at the end of the molecule of the block copolymer is treated, for example, with isopropyl alcohol, the polymerization is terminated. The lithium end of the block copolymer is converted into H, and the block copolymer of the present invention is obtained. It is understood that deactivation in the steps of polymerization is suppressed sufficiently, and the block copolymer specified according to the design before the preparation can be obtained, because the molecular weight distribution of the resultant block copolymer is relatively narrow.

A block copolymer represented by General Formula (I) in which n=1 and q=1 is obtained by the procedures described above except that a mixture of styrene and butadiene is used in the first and last steps. A block copolymer represented by General Formula (II) can also be obtained easily by arranging the procedures according to a similar principle to that for obtaining the block copolymer represented by General Formula (I).

The type of the vinylaromatic hydrocarbon monomer and the type of the conjugated diene monomer used for preparing the block copolymer of the present invention are as described above. The vinylaromatic hydrocarbon monomer and the conjugated diene monomer are used in amounts corresponding to the total content of the unit of the vinylaromatic hydrocarbon and the total content of the unit of the conjugated diene, respectively, in the block copolymer described above.

Various elements of the molecular structure of the block copolymer of the present invention, such as the number of the unit of styrene in a sequence in a block, the content of a block consisting of units of styrene in a sequence based on the total units of styrene, the content of the total styrene units in the block copolymer, the molecular weight of the block copolymer, and the content of the vinyl structure in the butadiene part, when a styrene/butadiene block copolymer is taken as an example, can be controlled according to chemical engineering by suitably selecting the conditions of the preparation, such as the ratio of the monomers, the amounts of the monomers used in the individual steps, the interval between the addition of a monomer in one step and the addition of the other monomer in the next step, the conversion of a monomer achieved in one step when the other monomer is added in the next step, the number of separate additions of the monomers, the amount of the organolithium initiator, and the type and the amount of the randomizer. Accordingly, a desired block copolymer can be obtained easily.

The block copolymer of the present invention includes a block copolymer having a molecular structure obtained by coupling the block copolymer represented by General Formula (I) or (II) with a multi-functional coupling agent. This block copolymer can be obtained, when similar procedures as those described above are conducted, by treating the active lithium at the end of the molecule of the block copolymer obtained in step (6) with a multi-functional coupling agent. The multi-functional coupling agent is at least one compound selected from the group consisting of tin compounds having a plurality of halogen atoms, silicon compounds having a plurality of halogen atoms, silicon compounds having a plurality of alkoxy groups, polyepoxy compounds, polyhalogenated hydrocarbons, esters of polycarboxylic acids, anhydrides of polyacids, polyisocyanates, polyaldehydes, polyketones, and polyvinyl compounds.

The block copolymer represented by General Formula (III) or (IV) can be obtained, when similar procedures as those described above are conducted, by treating the active lithium at the end of the molecule of the block copolymer obtained in step (6) with a polyfunctional coupling agent described above in place of treating the active lithium with an alcohol. Examples of the halogen compound of tin include tin halides, such as tin tetrachloride and the like, and organotin halides, such as dibutyldichlorotin, diphenyldichlorotin, triphenyltin chloride, and the like. Examples of the halogen compound of silicon include silicon tetrachloride, trichlorotriethylenesilane, and the like. The halogen compound of tin or the halogen compound of silicon is used in such an amount that one atom of the halogen in the halogen compound is present per one equivalent of the metal, such as lithium, at the active end of the block copolymer.

An alkoxysilane compound may be used in place of the halogen compound of tin or the halogen compound of silicon. Examples of the alkoxysilane compound include tetraalkoxysilane compounds, such as tetramethoxysilane, and the like; tetraaryloxysilane compounds, such as tetraphenoxysilane, and the like; alkylalkoxysilane compounds having 2 or more alkoxy groups, such as methyltriethoxysilane and the like; alkylaryloxysilane compounds having 2 or more aryloxy groups, such as methyltriphenoxysilane, and the like; alkenylalkoxysilane compounds having 2 or more alkoxy groups, such as vinyltrimethoxysilane, and the like; and halogenoalkoxysilane compounds, such as trimethoxychlorosilane, and the like. When an alkoxysilane compound is used, it is preferred that the resultant block. copolymer contains at least one alkoxysilano group. The block copolymers having the molecular structure described above are also included in the present invention. One equivalent of the metal, such as lithium, at the active end of the molecule of the block copolymer reacts with one equivalent of each alkoxy group in the alkoxysilane compound. Therefore, in order to prepare a block copolymer containing at least one alkoxysilano group, the amount of the alkoxysilane compound used is selected such that one alkoxy group in the alkoxysilane compound is reserved as the group to be incorporated into the block copolymer, and one equivalent of at least one of the remaining alkoxy groups is present per one equivalent of lithium at the active end of the molecule of the block copolymer. Because one alkoxy group in the alkoxysilane compound must be reserved as the group to be incorporated into the block copolymer, the alkoxysilane compounds described above (including alkoxysilane compounds containing two or more alkoxy groups) are used. When a halogenoalkoxysilane compound is used, one equivalent of the metal, such as lithium, at the active end of the block copolymer reacts with one equivalent of the halogen and with each of the alkoxy groups. Therefore, the amount of the halogenoalkoxysilane compound used for incorporating at least one alkoxy group into the block copolymer can be easily determined in a manner similar to that described above.

In place of the halogen compound of tin or the halogen compound of silicon, dihalide compounds, such as dichloroethane, dichloropropane, dichlorobutane, dichloropentane, dichlorobenzene, dibromomethane, dibromoethane, dibromopropane, dibromobutane, dibromopentane, dibromobenzene, or the like, may be used. The resultant block copolymer has a structure obtained by the reaction of one equivalent of the metal, such as lithium, at the active end of the block copolymer with one equivalent of each of the two halogen atoms. Therefore, the amount of the dihalide compound used can be determined in the same way as the amount of the halogen compound of tin or the halogen compound of silicon is determined.

In place of the halogen compound of tin or the halogen compound of silicon, at least one compound selected from compounds containing an isocyanate group, such as phenyl isocyanate, and the like; and compounds containing a—CZ—N< structure (Z: O or S), such as amide compounds, imide compounds, lactam compounds, urea compounds, derivatives of carbamic acid, derivatives of isocyanuric acid, and the like; may be added as an end modifier.

In the process for preparation of the block copolymer of the present invention, a solvent may be used for the polymerization, and the type of the solvent is not particularly limited. Examples of the solvent include aromatic hydrocarbon solvents, such as benzene, toluene, xylene, and the like; aliphatic hydrocarbon solvents, such as n-pentane, n-hexane, n-butane, and the like; alicyclic hydrocarbon solvents, such as methylcyclopentane, cyclohexane, and the like; and mixtures of these solvents.

Examples of the organometallic compound used as the polymerization initiator include generally known organometallic compounds, such as organolithium compounds and organosodium compounds. Preferable examples of the organometallic compounds include alkyl compounds, aryl compounds, aralkyl compounds, alkyltin compounds, and amide compounds, of lithium and sodium. Organometallic compounds comprising one or two lithium atoms are particularly preferable. In other words, a monovalent or divalent polymerization initiator comprising lithium is particularly preferable as the polymerization initiator. A monovalent polymerization initiator comprising lithium is more particularly preferable. Specific examples of the organometallic compound include: alkyllithiums and alkyldilithiums, such as methyllithium, ethyllithium, propyllithium, n-butyllithium, sec-butyllithium, t-butyllithium, hexyllithium, octyllithium, tetramethylenedilithium, pentamethylenedilithium, hexamethylenedilithium, and the like; aryllithiums and aryldilithiums, such as phenyllithium, tolyllithium, lithium naphthalide, and the like; aralkyllithiums and aralkyldilithiums, such as benzyllithium, a dilithium compound prepared by reaction of diisopropenylbenzene and butyllithium, and the like; alkyltinlithiums and alkyltindilithiums, such as tributyltinlithium, octyldi(tinlithium), and the like; and amidolithiums and amidodilithiums, such as diethylamidolithium, hexamethyleneimidolithium, N,N'-dimethyltetramethylenedi(amidolithium), and the like. Among these organometallic compounds, n-butyllithium and sec-butyllithium are most preferable because of advantages in industrial application. As polymerization initiators other than those described above, multivalent polymerization initiators comprising 3 or more lithium atoms may also be used.

When the block copolymer of the present invention is prepared by using an organometallic compound as the polymerization initiator, the group bonded to the beginning part (the part formed by the initiation of the polymerization) of the block copolymer represented by one of General Formulae (I) to (IV) is an organic group contained in the initiator of the organometallic compound. The block copolymer of the present invention includes a block copolymer having this group as a part of the structure thereof.

In a more specific example, when a monolithium compound (a monovalent lithium compound), such as n-butyllithium, tributyltinlithium, or hexamethyleneimidolithium, is used as the initiator of an organometallic compound, the group bonded to the beginning part (an end) of the molecule of the block copolymer is n-butyl group, tribuyltin group, or hexamethyleneimine group, respectively. Therefore, the resultant block copolymer has a structure represented by one of General Formulae (I) to (IV) in which the organic group of the monolithium compound is bonded to the beginning part thereof.

In another specific example, when a dilithium compound (a divalent lithium compound), such as tetramethylenedilithium, is used as the initiator of an organometallic compound, the same reaction as that of a monolithium compound takes place at the two positions having a lithium atom, and the group bonded to the beginning parts of two molecules of the block copolymer is a tetramethylene group shared by the two molecules. Therefore, the resultant block copolymer has a structure in which the beginning parts of the two molecules of the copolymer represented by one of General Formulae (I) to (IV) are respectively bonded to the two specific positions (the positions having the two lithium atoms in the original organometallic compound), such as the ends, of the organic group derived from the organometallic compound. When a multi-valent lithium compound having 3 or more lithium atoms is used, the resultant block copolymer has a structure which is formed by a reaction similar to that of the divalent lithium compound described above.

The amount of the polymerization initiator is selected in accordance with the molecular weight of the block copolymer to be prepared. The amount is generally 0.05 to 15 mmol, preferably 0.1 to 10 mmol, based on 100 g of the monomer. When the amount is more than 15 mmol, it is difficult to obtain a copolymer of a high molecular weight. When the amount is less than 0.05 mmol, the polymerization does not proceed in some cases.

A randomizer is preferably used to obtain a copolymer having a specified molecular structure. The randomizer is a compound having the function of controlling the microstructure of the conjugated diene part, such as increasing the content of the vinyl structure in the butadiene part, as well as the function of controlling the distribution of the monomer units in the copolymer, such as randomizing the distribution of the butadiene unit and the styrene unit, in the block copolymerization of the present invention. The type of the randomizer used in the present invention is not particularly limited, and any generally used randomizer can be used. Examples of the randomizer include:

(1) ethers;
(2) complexes of alkali metals and ketones or triesters of phosphorous acid;
(3) compounds represented by the following general formulae:

wherein R represents a group selected from aliphatic hydrocarbon groups, alicyclic hydrocarbon groups, and aromatic hydrocarbon groups, $M^1$ represents an alkali metal, particularly lithium, sodium, potassium, rubidium, or cesium, $M^2$ represents an alkaline earth metal, such as calcium or barium, and n represents an integer of 1 to 3; and (4) tertiary amines.

The randomizer may be used singly or as a combination of two or more types. Among these compounds, (1) ethers are preferable as the randomizer because the molecular structure can be controlled more easily.

In general, water, oxygen, carbon dioxide, and other catalyst poisons must be removed from all materials related to the polymerization process, such as initiator components, solvents, monomers, and the like.

The block copolymer of the present invention can be advantageously used as a thermosetting vulcanizable rubber used for applications such as automobile tires, particularly tire treads, as well as for gaskets, seats, belts, window frames, footwear, rubber threads, vibration damping rubbers, and packings. The block copolymer can also be used for shoe soles, floor tiles, pressure sensitive adhesive compositions, adhesive compositions, various types of molded articles, and the like.

To summarize the advantages obtained by the invention, the block copolymer of the present invention is advantageously used for a tire tread rubber which can achieve better physical properties, such as higher abrasion resistance, higher tensile strength at a high temperature, and the like, in good balance without adverse effect on other properties.

EXAMPLES

The invention will be understood more readily with reference to the following examples. However, these examples are intended to illustrate the invention and are not to be construed as limiting the scope of the invention.

Various measurements were conducted according to the following methods.

(1) The molecular weight and the molecular weight distribution (MWD) of the copolymer were measured by using a GPC apparatus (a product of Toso Co., Ltd., HLC-8020; column: a product of Toso Co., Ltd., GMH-XL, two columns connected in line). Average molecular weights ($M_n$ and $M_w$) were calculated using the polystyrene standard.

(2) The microstructure of the butadiene part (the content of the vinyl structure in % by mol) was obtained by an infrared spectroscopic analysis (Morero's method). The content of the total styrene units was obtained from integral ratio of aromatic proton signals to olefinic proton signals in a nuclear magnetic resonance ($^1$H-NMR) spectrum.

(3) The number of the styrene unit in sequences in blocks and the content of blocks were obtained according to an ozonolysis-gel permeation chromatography (GPC) method according to Tanaka et al., Polymer, Vol. 22, pages 1721 to 1723 (1981). GPC conditions were as follows.

an apparatus: a product of Toso Co., Ltd., HLC 8020 column: a product of Toso Co., Ltd., GMH-XL-L, two columns connected in line.

The peak of a block consisting of a sequence of 20 styrene units and the peak of a block consisting of a sequence of 200 styrene units were separated from each other by vertical separation of the peaks based on a calibration line obtained by using polystyrene as the reference material.

The content of a block consisting of a sequence of styrene units is expressed in % by weight based on the content of the total styrene units. (3) For measurement of coupling efficiency of a block copolymer coupled with tin, a GPC elution curve having two peaks was obtained, and the coupling efficiency (%) was obtained from the fraction of the area under the peak of the higher molecular weight based on the total area under the two peaks. The coupling efficiency of a block copolymer coupled with silicon was measured in the same way.

(4) The Mooney viscosity ($ML_{1+4}$) of a compounded rubber was measured by using a Mooney viscometer at 128° C.

(5) The physical properties of a vulcanized rubber were obtained according to the following methods.

Tensile strength was measured according to the method of Japanese Industrial Standard K6301 at room temperature or at 100° C. Abrasion resistance was calculated based on the amount of abraded rubber by using a Lambourn-type abrasion tester at room temperature with slipping ratios of 25% and 60%. In Example 4 and Comparative Example 4, abrasion resistance was also calculated from the amount of abraded rubber by using a DIN abrasion tester at room temperature. In Examples 1 and 2 and Comparative Example 1, abrasion resistance was expressed in terms of an index relative to the value in Comparative Example 2 used as the reference. In Example 3, abrasion resistance was expressed in terms of an index relative to the value in Comparative Example 3 used as the reference. In Example 4, abrasion resistance was expressed in terms of an index relative to the value in Comparative Example 4 used as the reference. In these cases, the reference value was standardized as 100, and a larger number shows better abrasion resistance.

Gripping property of a tire was evaluated from values of tan δ which were obtained by measurement of viscoelasticity. Values of tan δ obtained at the temperatures of 0, 30, and 50° C. with a strain of 1% at a frequency of 15 Hz were used. In Example 4 and Comparative Example 4, values of tan δ obtained at the temperature of 30° C. with a strain of 5% at a frequency of 15 Hz were used. The value of tan δ at 0° C. was used as an index of wet grip, and the values of tan δ at 30° and 50° C. were used as indices of dry grip. In all cases, a larger value of tan δ shows better grip.

Example 1

Into a 5 liter pressure-resistant reactor which had been heated to 60° C. in advance, 100 g of cyclohexane, a cyclohexane solution containing 5.07 g of styrene, 10 mol equivalent/Li of tetrahydrofuran (THF), and 1.8 mmol (0.9 mmol/100 g total monomer) of n-butyllithium as 1.6 mol solution in cyclohexane, were placed, and polymerization was allowed to proceed.

After allowing the polymerization to proceed for 7 minutes (conversion of styrene having reached 90% or more), the first block copolymerization was conducted by adding a cyclohexane solution containing 8.27 g of butadiene. After allowing the block copolymerization to proceed for 13 minutes (conversion of butadiene having reached 90% or more), a cyclohexane solution containing 5.07 g of styrene was added, and block copolymerization was allowed to proceed for 7 minutes. The procedures described above were repeated 14 times. Then, a cyclohexane solution containing 8.27 g of butadiene was added, and block copolymerization was allowed to proceed for 20 minutes while the mixture was stirred (the total time of the copolymerization being 307 minutes). During the whole period of the copolymerization, 5.07 g of styrene was added 15 times, and 8.27 g of butadiene was added 15 times. The total amount of styrene added was 76.0 g, and the total amount of butadiene added was 124.0 g. Finally, a small amount of isopropyl alcohol was added to the reaction system to terminate the copolymerization. After an antioxidant (BHT, 0.1% by weight to the polymer) was added, a block copolymer was isolated by reprecipitation in methanol.

Molecular structure of the resultant block copolymer was analyzed. The results are shown in Table 4.

The block copolymer thus obtained was milled with other ingredients according to the formulation shown in Table 1 by using a 250 ml laboplastomill and a 3 inch mill. The compounded rubber was vulcanized at 145° C. for 30 minutes. The physical properties of the vulcanized rubber were evaluated. The results are shown in Table 4.

Example 2

A block copolymer and a vulcanizate therefrom were obtained according to the same procedures as those in Example 1 except that the same total amounts of styrene and butadiene as those in Example 1 were added to the reaction system in 20 separate portions rather than in 15 separate portions as in Example 1 (i.e., in Example 2, the amount of styrene or butadiene added in each portion was 1/20 of the total amount of styrene or butadiene, respectively). The results of the analysis of the molecular structure of the block copolymer and the physical properties of the vulcanizate are shown in Table 4.

Comparative Example 1

A copolymer and a vulcanizate therefrom were obtained according to the same procedures as those in Example 1 except that the polymerization was conducted by adding a cyclohexane solution containing the total amount of styrene and the total amount of butadien to a solution containing cyclohexane, THF, and n-butyllithium continuously during the period of 120 minutes in order to obtain a copolymer having a completely random structure and no block of long sequences of styrene units. The results of the analysis of the molecular structure of the copolymer and the physical properties of the vulcanizate are shown in Table 4.

Comparative Example 2

A copolymer and a vulcanizate therefrom were obtained according to the same procedures as those in Example 1 except that the polymerization was conducted by adding a solution of n-butyllithium to a mixture of a cyclohexane solution, which contained the total amount of styrene and the total amount of butadiene, and a solution which contained 2.0 mol equivalent/Li of THF and 0.05 mol equivalent/Li of t-amyloxypotassium as the randomizers. It is known that a copolymer containing a sufficient amount of short sequences of styrene units is obtained when t-amyloxypotassium is used as the randomizer, as in the present comparative example. The results of the analysis of the molecular structure of the copolymer and the physical properties of the vulcanizate are shown in Table 4.

Example 3

A block copolymer and-a vulcanizate therefrom were obtained according to the same procedures as those in Example 1 except that the coupling reaction of the resultant block copolymer was conducted by adding 0.5 mol equivalent/Li of dibutyldichlorotin as 0.5 mol solution in cyclohexane before the addition of isopropyl alcohol after the block copolymerization was finished. The block copolymer thus obtained contained a tin-carbon bond. The block copolymer was milled with other ingredients according to the formulation shown in Table 2. The results of the analysis of the molecular structure of the block copolymer, including coupling efficiency, and the physical properties of the vulcanizate are shown in Table 4. The molecular weight and the molecular weight distribution shown in Table 4 are those of the component block copolymer before the coupling reaction.

Comparative Example 3

A copolymer and a vulcanizate therefrom were obtained according to the same procedures as those in Comparative Example 1 except that the coupling reaction of the resultant block copolymer was conducted by adding 0.5 mol equivalent/Li of dibutyldichlorotin as 0.5 mol solution in cyclohexane before the addition of isopropyl alcohol after the completely random copolymerization was finished. The copolymer thus obtained contained a tin-carbon bond. The block copolymer was milled with other ingredients according to the formulation shown in Table 2. The results of the analysis of the molecular structure of the copolymer, including coupling efficiency, and the physical properties of the vulcanizate are shown in Table 4. The molecular weight and the molecular weight distribution shown in Table 4 are those of the component copolymer before the coupling reaction.

Example 4

Into a 5 liter pressure-resistant reactor whose jacket had been heated to 60° C. in advance, 100 g of cyclohexane, a cyclohexane solution containing 7.60 g of styrene, 10 mol equivalent/Li of tetrahydrofuran (THF), and 1.2 mmol (0.6 mmol/100 g total monomer) of n-butyllithium as 1.6 mol solution in cyclohexane were placed, and polymerization was allowed to proceed.

After allowing the polymerization to proceed for 8 minutes (conversion of styrene having reached 90% or more), the first block copolymerization was conducted by adding a cyclohexane solution containing 12.40 g of butadiene. After allowing the block copolymerization to proceed for 15 minutes (conversion of butadiene having reached 90% or more), a cyclohexane solution containing 7.60 g of styrene was added, and block copolymerization was allowed to proceed for 8 minutes. The procedures described above in this paragraph were repeated 9 times. Then, a cyclohexane solution containing 12.40 g of butadiene was added, and copolymerization was allowed to proceed for 20 minutes while the mixture was stirred (the total time of copolymerization being 235 minutes). During the whole period of the copolymerization, 7.60 g of styrene was added 10 times, and 12.40 g of butadiene was added 10 times. The total amount of styrene added was 76.0 g, and the total amount of butadiene added was 124.0 g. After the block copolymerization was finished, the coupling reaction of the resultant block copolymer was conducted by adding 0.25 mol equivalent/Li of silicon tetrachloride as 0.5 mol solution in cyclohexane. The product of the coupling reaction was extended with oil by adding an aromatic oil in an amount of 75 parts by weight per 100 parts by weight of the rubber product (PHR). After adding an antioxidant (BHT 0.1 PHR), the oil extended block copolymer was separated by reprecipitation in methanol. The block copolymer thus obtained contained a silicon-carbon bond. The molecular structure of the component block copolymer before the coupling reaction was analyzed. The weight-average molecular weight of the block copolymer obtained after the coupling reaction was also measured. The results are shown in Table 5.

The block copolymer thus obtained was milled with other ingredients according to the formulation shown in Table 3 by using a 250 ml laboplastomill and a 3 inch mill. The Mooney viscosity of the resultant compounded rubber was measured. The compounded rubber was vulcanized at 145° C. for 30 minutes, and the physical properties of the vulcanized rubber were evaluated. The results are shown in Table 5.

Comparative Example 4

A copolymer having a completely random structure with no block consisting of long sequences of styrene units was obtained according to the same procedures as those in Example 4 except that the copolymerization was conducted by adding a cyclohexane solution, which contained the total amount of styrene and the total amount of butadiene, to a solution containing cyclohexane, THF, and n-butyllithium continuously over the period of 140 minutes. The coupling reaction of the copolymer thus obtained was conducted by adding 0.25 mol equivalent/Li of silicon tetrachloride as 0.5 mol solution in cyclohexane after the completely random copolymerization was finished. An oil extended block copolymer was prepared and separated by the same procedures as those in Example 4. The copolymer thus obtained contained a silicon-carbon bond. The molecular structure of the copolymer was analyzed and the physical properties of the vulcanizate were evaluated by the same methods as those in Example 4. The results are shown in Table 5.

TABLE 1

| | |
|---|---|
| styrene/butadiene copolymer | 100 parts by weight |
| HAF carbon black | 50 |
| stearic acid | 2 |
| antioxidant 6C*[1] | 1 |
| zinc oxide | 2.5 |
| vulcanization accelerator DPG*[2] | 0.2 |
| vulcanization accelerator DM*[3] | 0.2 |
| vulcanization accelerator NS*[4] | 0.6 |
| sulfur | 1.5 |

*[1]N-(1,3-dimethylbutyl)-N'-phenyl-p-phenylenediamine
*[2]diphenylguanidine
*[3]dibenzothiazyl disulfide
*[4]N-t-butyl-2-benzothiazylsulfenamide

TABLE 2

| | |
|---|---|
| styrene/butadiene copolymer | 70 parts by weight |
| natural rubber | 30 |
| HAF carbon black | 50 |
| aromatic oil | 5 |
| stearic acid | 2 |
| antioxidant 6C*[1] | 1 |
| zinc oxide | 2.5 |
| vulcanization accelerator DPG*[2] | 0.2 |
| vulcanization accelerator DM*[3] | 0.2 |
| vulcanization accelerator NS*[4] | 0.6 |
| sulfur | 1.5 |

*[1]N-(1,3-dimethylbutyl)-N'-phenyl-p-phenylenediamine
*[2]diphenylguanidine
*[3]dibenzothiazyl disulfide
*[4]N-t-butyl-2-benzothiazylsulfenamide

TABLE 3

| | |
|---|---|
| styrene/butadiene copolymer | 100 parts by weight |
| aromatic oil (used for oil extending) | 75 |
| I-ISAF carbon black | 90 |
| stearic acid | 1 |
| antioxidant 6C*[1] | 1 |
| zinc oxide | 3 |
| vulcanization accelerator DM*[2] | 0.2 |
| vulcanization accelerator TT*[3] | 0.6 |
| vulcanization accelerator NS*[4] | 0.4 |
| sulfur | 1.8 |

*[1]N-(1,3-dimethylbutyl)-N'-phenyl-p-phenylenediamine
*[2]dibenzothiazyl disulfide
*[3]tetramethylthiuram disulfide
*[4]N-t-butyl-2-benzothiazylsulfenamide

TABLE 4

| | Example | | | | | |
|---|---|---|---|---|---|---|
| | 1 | 2 | — | — | 3 | — |
| Comparative Example | — | — | 1 | 2 | — | 3 |
| molecular structure of copolymer | | | | | | |
| content of vinyl structure in butadiene part (%) | 25 | 25 | 25 | 25 | 25 | 25 |
| total content of styrene (% by wt.) | 38 | 38 | 38 | 38 | 38 | 38 |
| content of block of sequences of styrene units (% by wt.)*[1] | | | | | | |
| isolated single styrene unit | 22 | 25 | 88 | 25 | 20 | 87 |
| block of sequences of 2 to less than 20 styrene units | 52 | 55 | 12 | 69 | 52 | 13 |
| block of sequences of 20 to less than 200 styrene units | 26 | 20 | 0 | 6 | 28 | 0 |
| block of sequences of 200 or more styrene units | 0 | 0 | 0 | 0 | 0 | 0 |
| molecular weight of copolymer (× 10$^4$) ($M_n$) | 24 | 23 | 24 | 23 | 25 | 24 |
| molecular weight distribution ($M_w/M_n$) | 1.20 | 1.23 | 1.11 | 1.11 | 1.20 | 1.23 |
| efficiency of tin-coupling (%) | — | — | — | — | 75 | 83 |
| physical properties of vulcanizate | | | | | | |
| tensile strength at 100° C. (Kgf/cm$^2$) | 124 | 124 | 96 | 120 | 132 | 120 |
| tan δ at 0° C. | 0.489 | 0.501 | 0.407 | 0.350 | 0.461 | 0.416 |
| 30° C. | 0.215 | 0.200 | 0.190 | 0.180 | 0.191 | 0.130 |
| 50° C. | 0.170 | 0.168 | 0.170 | 0.171 | 0.130 | 0.110 |
| abrasion resistance (index)*[2] | | | | | | |
| 25% slipping ratio | 113 | 106 | 91 | 100 | 121 | 100 |
| 60% slipping ratio | 113 | 103 | 82 | 100 | 119 | 100 |

*[1]Content of block of sequences of styrene units: % by weight based on the total content of styrene.
*[2]For Examples 1 and 2 and Comparative Examples 1 and 2, the abrasion resistance of Comparative Example 2 was used as the index of 100. For Example 3 and Comparative Example 3, the abrasion resistance of Comparative Example 3 was used as the index of 100.

TABLE 5

|  | Example 4 | Comparative Example 4 |
|---|---|---|
| molecular structure of copolymer | | |
| content of vinyl structure in butadiene part (%) | 20 | 20 |
| total content of styrene (% by wt.) | 40 | 40 |
| content of block of sequences of styrene units (% by wt.)*[1] | | |
| isolated single styrene unit | 20 | 85 |
| block of sequences of 2 to less than 20 styrene units | 21 | 15 |
| block of sequences of 20 to less than 200 styrene units | 51 | 0 |
| block of sequences of 200 or more styrene units | 8 | 0 |
| molecular weight of copolymer ($\times 10^4$) ($M_n$) | 28 | 26 |
| molecular weight distribution ($M_w/M_n$) | 1.52 | 1.48 |
| molecular weight of copolymer after coupling ($\times 10^4$) ($M_w$) | 109 | 105 |
| efficiency of silicon-coupling (%) | 57 | 59 |
| Mooney viscosity $ML_{1+4}$(128° C.) | 62 | 60 |
| physical properties of vulcanizate | | |
| tensile strength (Kgf/cm$^2$) at room temperature | 190 | 175 |
| at 100° C. | 92 | 78 |
| tan δ at 30° C. | 0.59 | 0.49 |
| abrasion resistance (index)*[2] DIN abrasion | 129 | 100 |

*[1]Content of block of sequences of styrene units: % by weight based on the total content of styrene.
*[2]Here, the abrasion resistance of Comparative Example 4 was used as the index of 100.

[Results of analysis of the block copolymer by the ozonolysis-GPC method]

Figure 1:
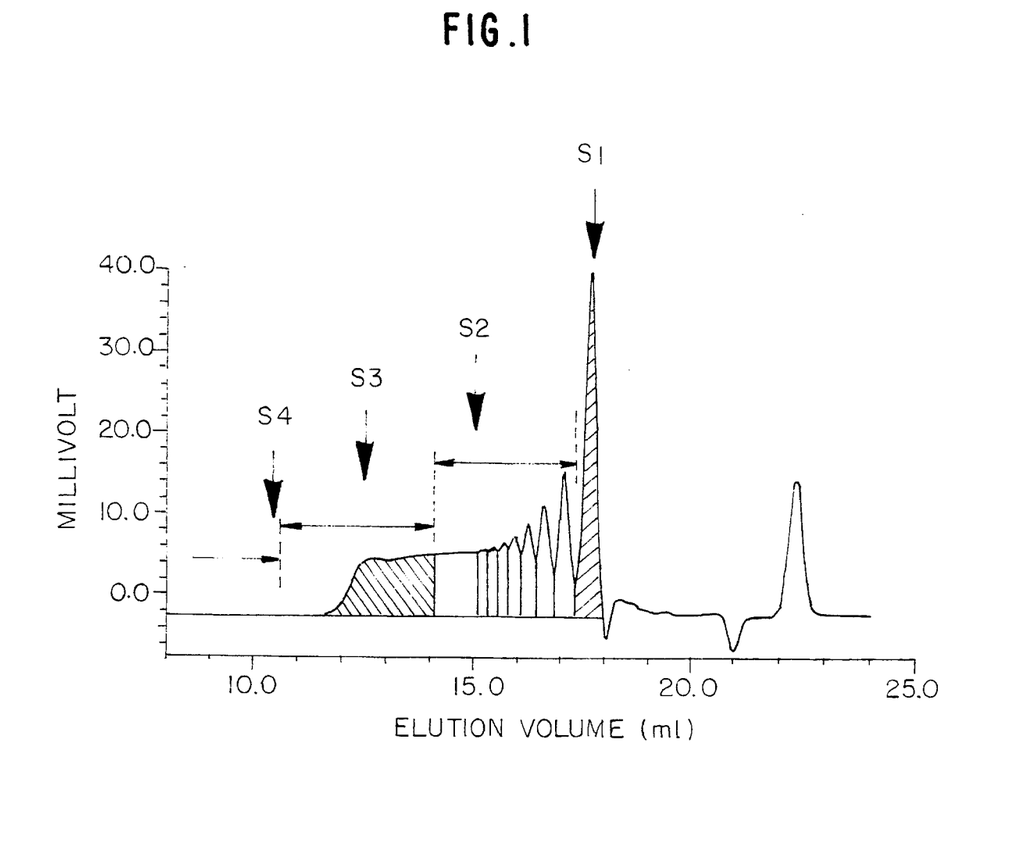
FIG. 1 illustrates a GPC chart of the product of ozonolysis of the block copolymer obtained in Example 1.

FIG. 1 illustrates a GPC chart of the product of ozonolysis of the block copolymer obtained in Example 1. The contents of the blocks consisting of various sequences of styrene units shown in Table 4 can be obtained from the GPC chart. The content of the isolated single styrene unit, the content of styrene blocks consisting of sequences of 2 to less than 20 styrene units, the content of styrene blocks consisting of sequences of 20 to less than 200 styrene units, and the content of blocks consisting of sequences of 200 or more styrene units, are obtained from the peaks designated as S-1, S-2, S-3, and S-4, respectively. The contents thus obtained were 22, 52, 26, and 0% by weight, respectively.

[Results of measurement of viscoelasticity of the copolymers]

Figure 2:
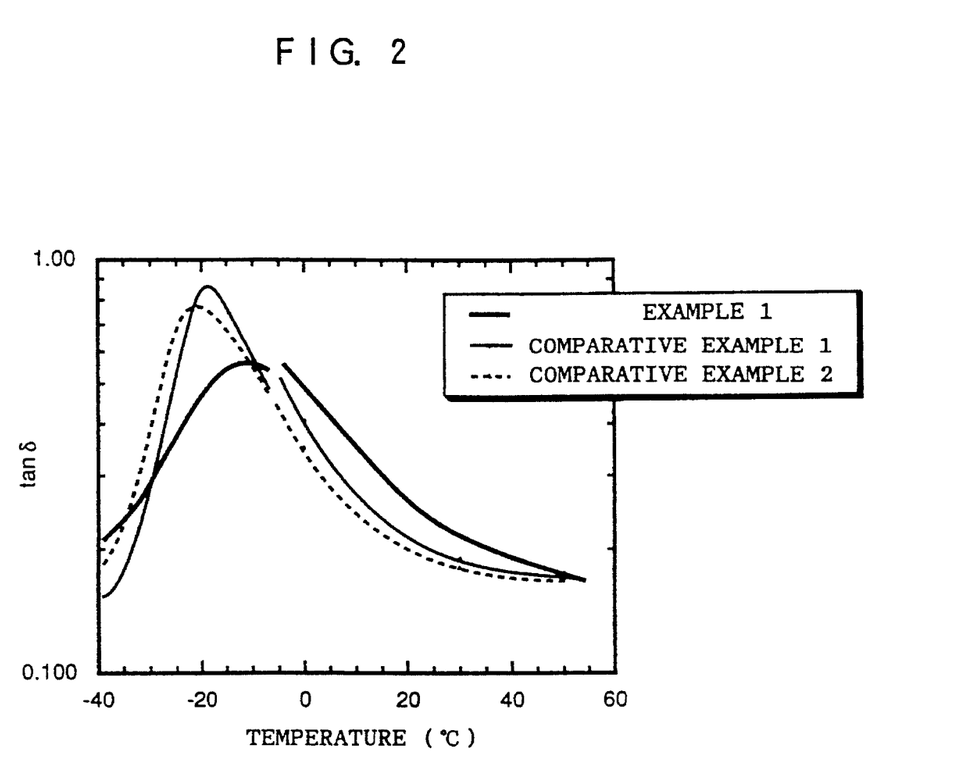
FIG. 2 illustrates viscoelasticity dispersions of copolymers obtained in Example 1, and Comparative Examples 1 and 2.

FIG. 2 illustrates viscoelasticity dispersions of copolymers obtained in Example 1 and in Comparative Examples 1 and 2. The curves shown in the figure are not continuous because the measurements were conducted at a strain of 0.1% at very low temperatures and at a strain of 1% at higher temperatures. From the temperature dependency of tan δ shown in the figure, it can be understood that the dependency is broader when the content of the styrene blocks is larger, particularly when the content of the styrene blocks consisting of longer sequences of styrene units is larger. The dependency becomes broader in the following order: Comparative Example 1, Comparative Example 2, and Example 1, with the dependency being significantly broader in Example 1 than those in other examples. This result clearly shows that the block copolymer obtained in Example 1 had better dry grip.

As shown in Tables 4 and 5 and FIGS. 1 and 2, it is apparent that the block copolymers of the present invention (Examples 1, 2, 3, and 4) had the desired molecular structures. It is also shown that the block copolymers of the present invention were remarkably excellent in tensile strength at high temperatures, abrasion resistance, wet grip (tan δ at 0° C.), and dry grip (tan δ at 30° C.).

The copolymer in Comparative Example 1 had an approximately completely random structure. The copolymer in Comparative Example 2 had a molecular structure containing a small amount (6% by weight) of blocks consisting of long sequences of 20 to less than 200 styrene units. The copolymer in Comparative Example 3 had an approximately completely random structure, and contained a tin-carbon bond. The copolymer in Comparative Example 4 had a high molecular weight and an approximately completely random structure, and contained a silicon-carbon bond. Thus, the copolymers in the comparative examples all had molecular structures different from those of the block copolymers in the examples. When the results in Comparative Examples 1 and 2 are compared with those in Examples 1 and 2, the results in Comparative Example 3 are compared with those in Example 3, and the results in Comparative Example 4 are compared with those in Example 4, it can be understood that the copolymers in the comparative examples had inferior physical properties to those of the copolymers in the examples.

What is claimed is:

1. A block copolymer which comprises a block (block A) containing as a main component thereof a homopolymer consisting of units of a vinylaromatic hydrocarbon, a homopolymer block (block B) consisting of units of a conjugated diene, and a copolymer block (block C) consisting of units of the vinylaromatic hydrocarbon and units of the conjugated diene, which is represented by General Formulae (I) or (II), and which has a structure in which blocks A, B, and C are repeated in the order shown in the General Formulae (I) or (II) which represents said block copolymer, said block copolymer having:

a content ($L^1$) of blocks consisting of sequences of 20 to less than 200 units of the vinylaromatic hydrocarbon in the range of 15 to 98% by weight, a content ($L^2$) of blocks consisting of sequences of 200 units or more of the vinylaromatic hydrocarbon in the range of 10% by weight or less, a content ($L^3$) of an isolated single unit of the vinylaromatic hydrocarbon in the range of 1 to 70% by weight, and a content of blocks consisting of sequences of 2 to less than 20 units of the vinylaromatic hydrocarbon of [100−($L^1$+$L^2$+$L^3$)] % by weight, each based on total units of the vinylaromatic hydrocarbon;

a content of total units of the vinylaromatic hydrocarbon in the range of 15 to 65% by weight of said block copolymer;

a content of total units of the conjugated diene in the range of 85 to 35% by weight of said block copolymer; and a number-average molecular weight of said block copolymer in the range of $5 \times 10^4$ to $150 \times 10^4$, wherein in the formulae, A represents block A, B represents block B, C represents block C, m represents an integer of 4 to 100, n, p, and q each represent 0 or 1, a plurality of block A present in said block copolymer may be the same or different, a plurality of block B present in said block copolymer may be the same or different, and a plurality of block C present in said block copolymer may be the same or different.

2. A block copolymer according to claim 1, wherein the unit of a vinylaromatic hydrocarbon is a unit of styrene, and the unit of a conjugated diene is a unit of butadiene or a unit of isoprene or a mixture of a unit of butadiene and a unit of isoprene.

3. A block copolymer according to claim 1, wherein the unit of a vinylaromatic hydrocarbon is a unit of styrene, and the unit of a conjugated diene is a unit of butadiene.

4. A block copolymer according to claim 1, wherein m in General Formula (I) or (II) is an integer of 8 to 25.

5. A block copolymer according to claim 1, wherein said block copolymer has a content ($L^1$) of blocks consisting of sequences of 20 to less than 200 units of the vinylaromatic hydrocarbon in the range of 20 to 98% by weight, a content ($L^2$) of blocks consisting of sequences of 200 units or more of the vinylaromatic hydrocarbon in the range of 8% by weight or less, a content ($L^3$) of an isolated single unit of the vinylaromatic hydrocarbon in the range of 1 to 40% by weight, and a content of blocks consisting of sequences of 2 to less than 20 units of the vinylaromatic hydrocarbon of $[100-(L^1+L^2+L^3)]$ % by weight, each based on total units of the vinylaromatic hydrocarbon.

6. A block copolymer according to claim 1, wherein said block copolymer has a content of total units of the vinylaromatic hydrocarbon in the range of 15 to 45% by weight of said block copolymer, and a content of total units of the conjugated diene in the range of 85 to 55% by weight of said block copolymer.

7. A block copolymer according to claim 1, wherein the unit of a conjugated diene monomer is a unit of butadiene, and the content of the vinyl structure of the unit of butadiene is 10 to 60% by mol of total units of butadiene.

8. A block copolymer according to claim 1, wherein said block copolymer has a number-average molecular weight in the range of $10 \times 10^4$ to $110 \times 10^4$.

9. A block copolymer which contains a component block copolymer comprising a block (block A) containing as a main component thereof a homopolymer consisting of units of a vinylaromatic hydrocarbon, a homopolymer block (block B) consisting of units of a conjugated diene, and a copolymer block (block C) consisting of units of the vinylaromatic hydrocarbon and units of the conjugated diene, said block polymer being represented by General Formulae (III) or (IV) and having a structure in which blocks A, B, and C are repeated in the order shown in the General Formulae (III) or (VI) which represents said block copolymer, and said block copolymer having a structure in which the component block copolymers are bonded to each other through a tin atom or a silicon atom, and said block copolymer having:

a content ($L^1$) of blocks consisting of sequences of 20 to less than 200 units of the vinylaromatc hydrocarbon in the range of 15 to 98% by weight, a content ($L^2$) of blocks consisting of sequences of 200 units or more of the vinylaromatic hydrocarbon in the range of 10% by weight or less, a content ($L^3$) of an isolated single unit of the vinylaromatic hydrocarbon in the range of 1 to 70% by weight, and a content of blocks consisting of sequences of 2 to less than 20 units of the vinylaromatic hydrocarbon of $[100-(L^1+L^2+L^3)]$ % by weight, each based on total units of the vinylaromatic hydrocarbon, a content of total units of the vinylaromatic hydrocarbon in the range of 15 to 65% by weight of said block copolymer, and a content of total units of the conjugated diene in the range of 85 to 35% by weight of said block copolymer; and the component block copolymer has a number-average molecular weight in the range of $5 \times 10^4$ to $150 \times 10^4$, $$[(c)_n\text{---}A\text{---}(C\text{---}B\text{---}C\text{---}A)_m\text{---}(C\text{---}B)_p\text{---}(C)_q]_x Y \quad \text{General formula III}$$

$$[(c)_n\text{---}B\text{---}(C\text{---}A\text{---}C\text{---}B)_m\text{---}(C\text{---}A)_p\text{---}(C)_q]_x Y \quad \text{General formula IV}$$

Wherein in the formulae, A represents block A; B represents block B; C represents block C; Y represents the residue of a polyfunctional coupling agent which is selected from the group consisting of tin compounds having a plurality of halogen atoms, silicon compounds having a plurality of halogen atoms, silicon compounds having a plurality of alkoxy groups, polyepoxy compounds, polyhalogenated hydrocarbons, esters of polycarboxylic acids, anhydrides of polyacids, polyisocyanates, polyaldehydes, polyketones, and polyvinyl compounds; m represents an integer of 4 to 100; n, p, and q each represent 0 or 1; x represents an integer of more than 2; a plurality of block A present in said block copolymer may be the same or different; a plurality of block B present in said block copolymer may be the same or different; and a plurality of block C present in said block copolymer may be the same or different.

10. A block copolymer according to claim 9, wherein Y represents a halogenated tin or a halogenated silicon compound residue.

11. A block copolymer according to claim 9, wherein the unit of a vinylaromatic hydrocarbon is a unit of styrene, and the unit of a conjugated diene is a unit of butadiene or a unit of isoprene or a mixture of a unit of butadiene and a unit of isoprene.

12. A block copolymer according to claim 9, wherein the unit of a vinylaromatic hydrocarbon is a unit of styrene, and the unit of a conjugated diene is a unit of butadiene.

13. A block copolymer according to claim 9, wherein m in General Formula (III) or (IV) is an integer of 8 to 25.

14. A block copolymer according to claim 9, wherein said block copolymer has a content ($L^1$) of blocks consisting of sequences of 20 to less than 200 units of the vinylaromatic hydrocarbon in the range of 20 to 98% by weight, a content ($L^2$) of blocks consisting of sequences of 200 units or more of the vinylaromatic hydrocarbon in the range of 8% by weight or less, a content ($L^3$) of an isolated single unit of the vinylaromatic hydrocarbon in the range of 1 to 40% by weight, and a content of blocks consisting of sequences of 2 to less than 20 units of the vinylaromatic hydrocarbon of $[100-(L^1+L^2+L^3)]$ % by weight, each based on total units of the vinylaromatic hydrocarbon.

15. A block copolymer according to claim 9, wherein said block copolymer has a content of total units of the vinylaromatic hydrocarbon in the range of 15 to 45% by weight of said block copolymer, and a content of total units of the conjugated diene in the range of 85 to 55% by weight of said block copolymer.

16. A block copolymer according to claim 9, wherein the unit of a conjugated diene monomer is a unit of butadiene, and the content of the vinyl structure of the unit of butadiene is 10 to 60% by mol of total units of butadiene.

17. A block copolymer according to claim 9, wherein the component block copolymer has a number-average molecular weight in the range of $10 \times 10^4$ to $110 \times 10^4$.

* * * * *